(12) United States Patent
Hasson et al.

(10) Patent No.: US 7,997,903 B2
(45) Date of Patent: Aug. 16, 2011

(54) MEDICAL TRAINING APPARATUS

(75) Inventors: Harrith M. Hasson, Chicago, IL (US); Paul Yarin, Los Angeles, CA (US)

(73) Assignee: Realsim Systems, LLC, Albuquerque, NM (US)

( * ) Notice: Subject to any disclaimer, the term of this patent is extended or adjusted under 35 U.S.C. 154(b) by 1442 days.

(21) Appl. No.: 10/349,420

(22) Filed: Jan. 22, 2003

(65) Prior Publication Data
US 2004/0142314 A1 Jul. 22, 2004

(51) Int. Cl.
G09B 23/28 (2006.01)

(52) U.S. Cl. ........................................ 434/262

(58) Field of Classification Search .......... 434/262–275; 500/104; 99/323.7, 323.8; 198/394
See application file for complete search history.

(56) References Cited

U.S. PATENT DOCUMENTS

| | | | |
|---|---|---|---|
| 4,907,973 A * | 3/1990 | Hon | 434/262 |
| 5,259,716 A * | 11/1993 | Hoshino et al. | 414/223.01 |
| 5,403,191 A * | 4/1995 | Tuason | 434/262 |
| 5,425,644 A | 6/1995 | Szinicz | |
| 5,587,937 A | 12/1996 | Massie et al. | |
| 5,620,326 A | 4/1997 | Younker | |
| 5,623,582 A | 4/1997 | Rosenberg | |
| 5,625,576 A | 4/1997 | Massie et al. | |
| 5,704,791 A | 1/1998 | Gillio | |
| 5,767,839 A | 6/1998 | Rosenberg | |
| 5,769,640 A | 6/1998 | Jacobus et al. | |
| 5,771,181 A | 6/1998 | Moore et al. | |
| 5,800,178 A | 9/1998 | Gillio | |
| 5,800,179 A | 9/1998 | Bailey | |
| 5,821,920 A | 10/1998 | Rosenberg et al. | |
| 5,853,292 A * | 12/1998 | Eggert et al. | 434/262 |
| 5,873,732 A | 2/1999 | Hasson | |
| 5,882,206 A | 3/1999 | Gillio | |
| 5,947,743 A | 9/1999 | Hasson | |
| 6,016,301 A | 1/2000 | Takasawa et al. | |
| 6,057,828 A | 5/2000 | Rosenberg et al. | |
| 6,062,865 A | 5/2000 | Bailey | |
| 6,066,105 A * | 5/2000 | Guillen | 600/595 |
| 6,113,395 A | 9/2000 | Hon | |
| 6,246,390 B1 | 6/2001 | Rosenberg | |

(Continued)

OTHER PUBLICATIONS

Derossis, A.M. et al. ; The Effect of Practice on Performance in a Laparoscopic Simulator ; Surgical Endoscopy (1998) 12:1117-1120.*

*Primary Examiner* — Xuan M Thai
*Assistant Examiner* — Timothy Musselman
(74) *Attorney, Agent, or Firm* — Wood, Phillips, Katz, Clark & Mortimer (57) ABSTRACT

A medical training apparatus comprises a frame defining a work space simulating a body cavity and having an access opening to allow introduction of a medical instrument to the working space from externally of the working space. A sensor platform is rotationally mounted in the working space for rotating the platform to select angular positions for performing a series of simulated medical procedures. A plurality of modules are mounted around a perimeter of the platform. Each module comprises a different model upon which an associated medical procedure can be performed with a medical instrument. A plurality of sensors are each operatively associated with one of the modules for sensing progress of the associated medical procedure. A control unit is coupled to the sensors for monitoring progress of the medical procedures and providing an indication of status of the medical procedures.

19 Claims, 10 Drawing Sheets

U.S. PATENT DOCUMENTS

| | | |
|---|---|---|
| 6,267,599 B1 | 7/2001 | Bailey |
| 6,323,837 B1 | 11/2001 | Rosenberg |
| 6,366,272 B1 | 4/2002 | Rosenberg et al. |
| 6,377,011 B1 | 4/2002 | Ben-Ur |
| 6,398,557 B1 * | 6/2002 | Hoballah ................ 434/272 |
| 6,405,158 B1 | 6/2002 | Massie et al. |
| 6,428,323 B1 * | 8/2002 | Pugh .................... 434/274 |
| 6,659,776 B1 * | 12/2003 | Aumann et al. ........... 434/262 |
| 6,773,263 B2 * | 8/2004 | Nicholls et al. .......... 434/267 |
| 2001/0055748 A1 | 12/2001 | Bailey |

* cited by examiner

MEDICAL TRAINING APPARATUS

FIELD OF THE INVENTION

This invention relates to medical procedures, and, more particularly, to a training apparatus that can be used to practice medical procedures and provide feedback.

BACKGROUND OF THE INVENTION

The performance of laparoscopy requires precise and controlled manipulation of medical instruments. Acquiring skills in video laparoscopy is time consuming and difficult. This is due to problems with orientation and hand-eye coordination associated with manipulating three dimensional objects that are viewed in a two dimensional format on a video monitor.

The learning curve in the operating room can be shortened by using training models. The models may be animate or inanimate. Animate models are realistic, but they require elaborate preparation, logistics and great expense. Further, because of humane considerations, training on animate objects is frowned upon. These factors contribute to the impracticality of using animate objects in training to perform laparoscopy. Inanimate training objects are commonly used. A number of these available trainers are cumbersome, unrealistic, ineffective and expensive. There are available models of human anatomy which, while lifelike, are expensive and may be usable only once to practice a particular procedure.

For training aids that have a fixed configuration, only limited movements and procedures may be practically carried out.

All of the above factors contribute to doctors often practicing less than is desirable for laparoscopy. This is particularly a problem given that laparoscopy is one of the more demanding types of surgery. Repetitive movements may be required to develop the dexterity and hand-eye coordination necessary for successful surgical outcomes.

Ideally, surgeons wish to have available to them a relatively inexpensive structure which is unobtrusive and which can be conveniently employed to allow surgeons, in their available time, to practice and perfect surgical skills. U.S. Pat. Nos. 5,873,732 and 5,947,743 disclose a physical laparoscopy training simulator which utilizes natural haptics to measure and develop laparoscopic skills. The simulator was comprised of a housing constructed with a multi-layered covering simulating the anterior abdominal wall and an adjustable floor mat suspended within the housing. The floor mat supported exercise models dedicated to specific laparoscopic skills. The models are viewed through a stand alone camera or a laparoscopy camera attached to a scope inserted through a cannula placed at the primary entry site. The scope is connected to a light source and the camera to a video monitor. Surgical manipulation of exercise models is carried out with standard laparoscopic tools directed from strategically located secondary points of entry. However, the referenced simulators do not provide for immediate user feedback and capture of performance data. Automated data capture makes the system well suited for controlled testing and performance qualifications.

SUMMARY OF THE INVENTION

In accordance with the invention there is provided a medical training apparatus that provides an indication of the status of a medical procedure.

In accordance with one aspect of the invention there is disclosed a medical training apparatus comprising a frame defining a work space simulating a body cavity and having an access opening to allow introduction of a medical instrument to the working space from externally of the working space. A model is mounted in the working space upon which a medical procedure can be performed with a medical instrument. A sensor is operatively associated with the model for sensing progress of the medical procedure. A control unit is coupled to the sensor for monitoring progress of the medical procedure and providing an indication of status of the medical procedure.

In one aspect of the invention the model comprises a peg board model comprising a plate having a plurality of openings and a plurality of pegs for insertion in the openings and the sensor senses presence or absence of a peg in each opening. The sensor comprises a plurality of photointerrupters.

In another aspect of the invention the model comprises a ring model comprising a plate having a conductive post spaced from a bent wire and a conductive ring to be received on the wire. The sensor senses presence or absence of the ring on the wire. The sensor measures resistance between the post and the wire. The conductive rings comprise conductive rubber O-rings.

In accordance with another aspect of the invention the model comprises a canulation model comprising a plate supporting a tube for receiving an elongate element and the sensor senses presence of the elongate element in the tube. The sensor comprises an inductive winding surrounding the tube and the control unit senses changes in inductance.

In accordance with yet another aspect of the invention the model comprises a knot tying model comprising a base supporting a tubular element and the sensor comprises a coaxial cable in the tubular element having a conductive foam insulator and the control unit measures conductivity across the coaxial cable.

In accordance with yet another aspect of the invention the model comprises a knot integrity model comprising first and second webs supported relative to a base and the sensor comprises means for moving the webs relative to one another and detecting displacement between the webs. The first plate is fixed and the sensor comprises a server motor operatively coupled to the second web for moving the second web relative to the first web.

It is a the feature of the invention that the control unit comprises a video camera for photographing the working space and a video monitor displaying video from the camera with an overlay indicating status of the medical procedure.

It is another feature of the invention that the control unit includes actuators for manually initiating the medical procedure and visual indicators for indicating status of the medical procedure.

It is yet another feature of the invention that the control unit comprises a programmed processing system for logging results of medical procedures.

In another form the medical training apparatus comprises a frame defining a work space simulating a body cavity and having an access opening to allow introduction of a medical instrument to the working space from externally of the working space. A rotary platform is rotationally mounted in the working space for rotating the platform to select angular positions for performing a series of simulated medical procedures. A plurality of modules are mounted around a perimeter of the rotary platform. Each module comprises a different model upon which an associated medical procedure can be performed with a medical instrument. A plurality of sensors are each operatively associated with one of the modules for sensing progress of the associated medical procedure. A control unit is coupled to the sensors for monitoring progress of the medical procedures and providing an indication of status of the medical procedures.

It is a feature of the invention that the rotary platform comprises a potentiometer mounted to a base and a carousel mounted to the potentiometer is electrically connected to the control unit to detect angular position. The carousel supports the modules and a circuit board connecting the sensors.

Further features and advantages of the invention will be readily apparent from the specification and from the drawings.

DETAILED DESCRIPTION OF THE INVENTION

Figure 1:
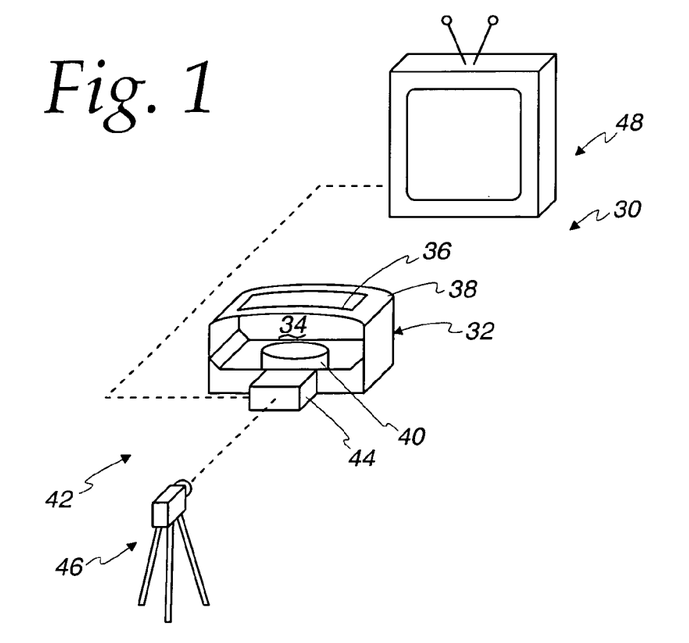
FIG. 1 is a perspective view of a stand alone version of a medical training apparatus in accordance with the invention.

Referring initially to FIG. 1, a medical training apparatus 30 according to the present invention is illustrated. The training apparatus 30 consists of a frame 32 bounding a working space 34 which simulates a body cavity. The frame 32 is constructed so that the working space 34 has a general shape and dimensions of a distended human abdomen. An access opening 36 is provided through a top wall 38 of the frame 32 and defines a communication path from externally of the frame 32 to the working space 34 to allow introduction of a medical instrument to the working space 34 to simulate a laparoscopic procedure, as described below.

A rotary sensor platform 40 is rotationally mounted in the working space 34 for rotating the platform to select angular positions for performing a series of procedures, corresponding to and simulating medical procedures. As described below, the rotary sensor platform 40 supports a plurality of modules each comprising a different, discrete model upon which an associated medical procedure can be performed. Sensors are associated with each of the modules. A control unit or system 42 is coupled to the sensors for monitoring progress of the medical procedure and providing an indication of status of the medical procedure. The control system 42 comprises a control panel 44, a video camera 46 and a video monitor 48. The video camera 46 and video monitor 48 are electrically connected to the control panel 44, as described more specifically below.

Figure 2:
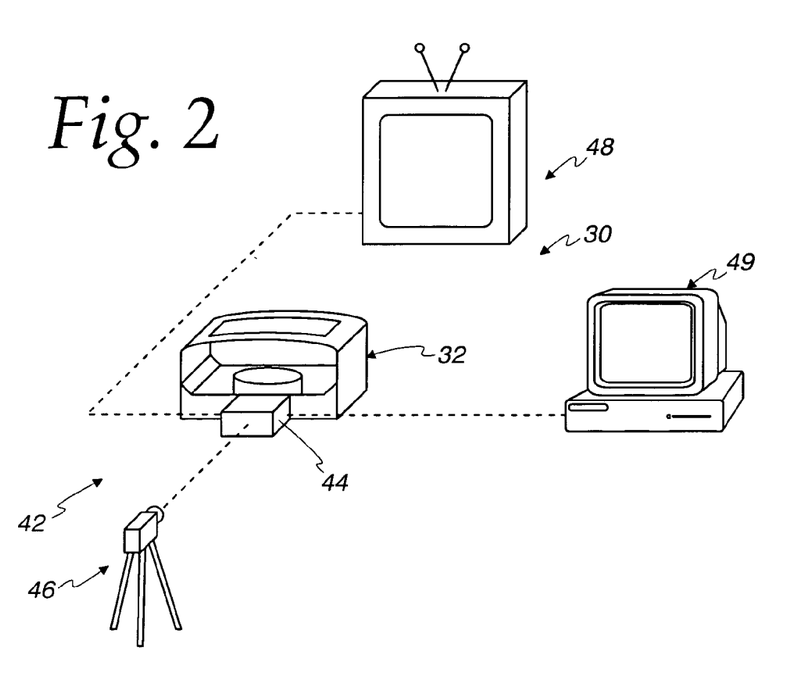
FIG. 2 is a perspective view of the medical training apparatus of FIG. 1 connected to a personal computer.

FIG. 2 illustrates an alternative embodiment of the medical training apparatus 30 in which the control unit 42 further comprises a personal computer 49 electrically connected to the control panel 44.

Figure 3:
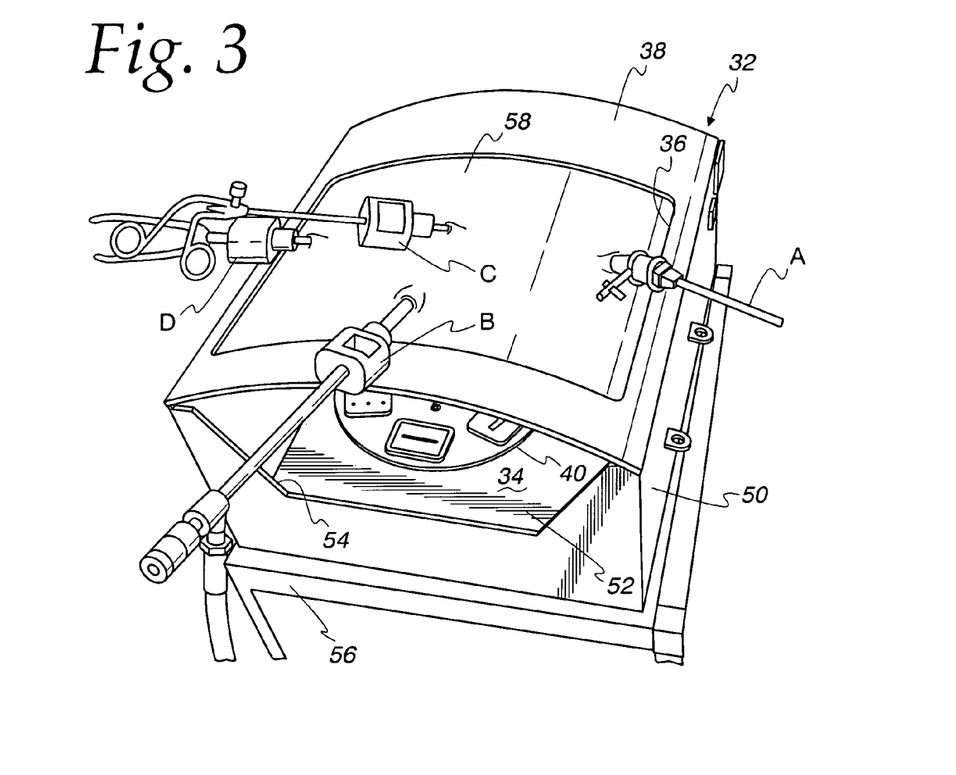
FIG. 3 is a perspective view of a frame of the medical training apparatus of FIG. 1.

Referring to FIG. 3, the frame 32 is illustrated in greater detail. The frame 32 may be as generally described in U.S. Pat. Nos. 5,873,732 and 5,947,743, the specifications of which are hereby incorporated by reference herein.

In addition to the top wall 38, the frame 32 comprises a perimeter sidewall 50 connected to the top wall 38 and a bottom wall 52 to define the working space 34. The sidewall 50 includes an end wall opening 54 providing access to the working space 34. The frame 32 may be mounted on a table or supported by a cart 56, as necessary or desired.

To simulate human tissue, a membrane layer 58 is placed over the access opening 36. The membrane layer 58 may be, for example, a flexible, cloth membrane layer, as described in the referenced patents. An operator can direct medical instruments, such as instruments A, B, C and D through the membrane layer 58 from externally of the working space 14 to within the working space 34. The instruments A-D are inserted through suitable openings provided in the membrane layer 58. The membrane layer 58 preferably has a thickness and texture to produce the flexibility of human tissue so that the operator has the same sensation as existing during an actual operation. In one form, three layers of rubber, sponge and/or latex are used to define the membrane layer 58.

Figure 4:
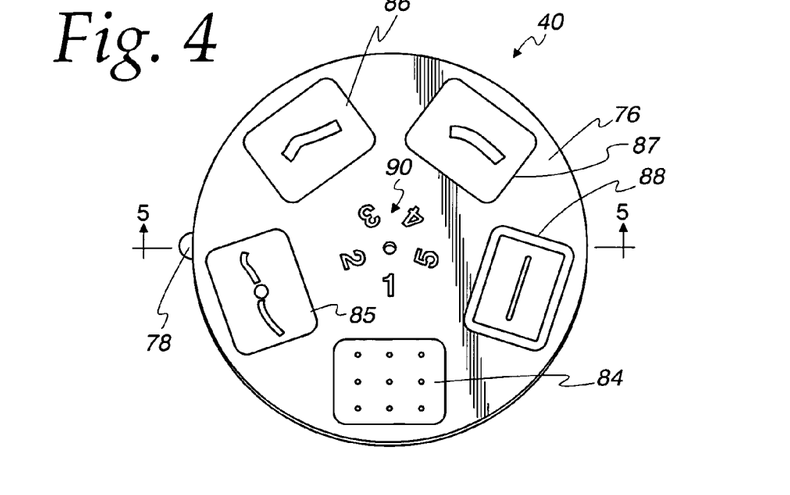
FIG. 4 is a top plan view of a rotary sensor platform of the medical training apparatus of FIG. 1.
Figure 5:
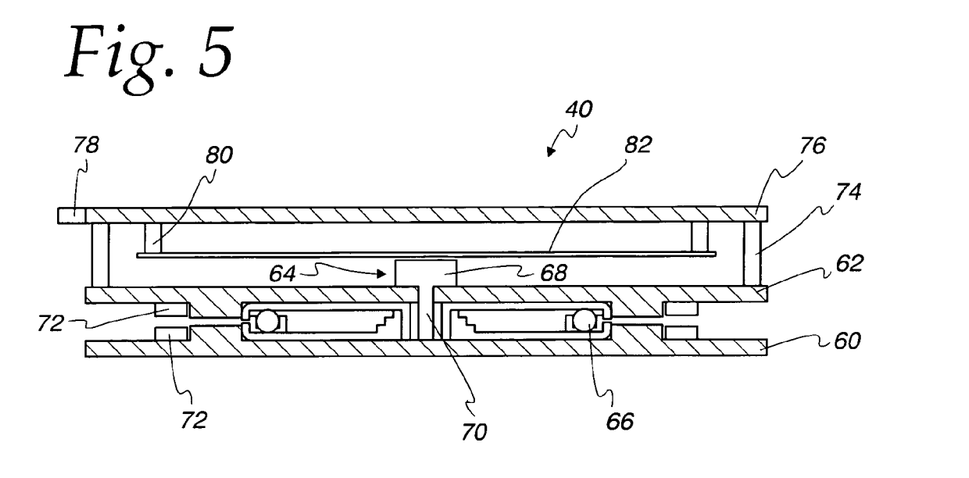
FIG. 5 is a sectional view of the rotary sensor platform of FIG. 4 with parts removed for clarity.

Referring to FIGS. 4 and 5, the sensor platform 40 is illustrated. The sensor platform 40 may comprise a rotating 12 inch circular acrylic carousel that attaches to the inside of the frame 32. More particularly, the sensor platform 40 comprises a carousel base 60 supporting a platform 62 via a rotary potentiometer 64. A bearing mechanism 66 is disposed between the base 60 and platform 62 for facilitating rotation. Particularly, the potentiometer 64 includes a fixed resistive element 68 mounted to the platform 62 and a rotary shaft 70 extending therefrom operatively connected to the base 60. The sensor platform 40 is mounted in the working space 34 with the base 60 affixed thereto. As is apparent, rotation of the platform 62 relative to the base 60 changes resistance of the potentiometer 64. The resistance of the potentiometer 64 is used to detect angular position of the sensor platform 40. Additionally, the sensor platform 40 has detent magnets 72 that allow it to "lock" into each of five desired positions with some tension.

A plurality of supports 74 mount a carousel cover 76 to the carousel platform 62. The carousel cover is generally circular and in the illustrated embodiment of the invention is approximately 12 inches in diameter. A finger tab 78 at one edge can be used to manually rotate the cover 76 relative to the base 60.

A plurality of printed circuit board supports 80 extend downwardly from the cover 76 and support a sensor printed circuit board 82. Although not shown, leads of the potentiometer resistive element 68 are electrically connected to the printed circuit board 82.

Referring particularly to FIG. 4, the carousel cover 76 supports five modules 84, 85, 86, 87 and 88 around its perimeter. Each module 84-88 comprises a different model upon which an associated medical procedure can be performed with a medical instrument, such as instruments A-D of FIG. 3, to perform a task that changes the model in a predetermined manner. An operator can switch among tasks by turning the carousel cover 76 using the finger tab 78 to the next module 84, 85, 86, 87 or 88, which are represented by numerals 90 molded on the cover 76, as shown in FIG. 4.

In accordance with the invention, the sensor platform 40 has five task modules. The first is a peg module 84 used to detect insertion of pegs into a grid of nine holes. Holes are spaced about 10 mm apart. The second module 85 consists of a ring module having bent wire forms onto which O-rings can be threaded. The third module 86 comprises a canulation module. The fourth module 87 consists of a knot tying module. The fifth module 88 consists of a knot integrity test module.

Figure 6:
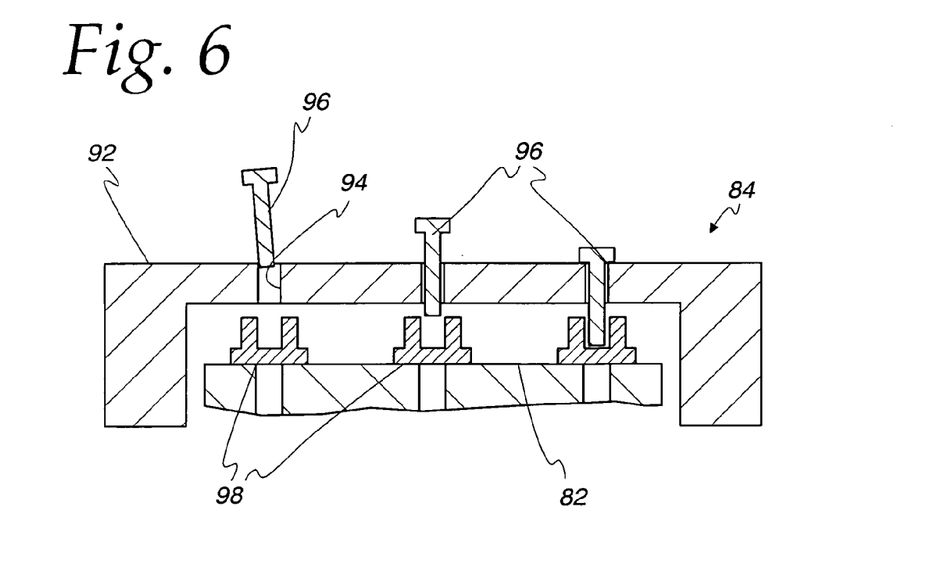
FIG. 6 is a partial sectional view of a peg board model of the rotary sensor platform of FIG. 1.

Referring also to FIG. 6, the peg module 84 is illustrated in greater detail. The peg module comprises a base plate 92 which may comprise the carousel cover 76. The base plate 92 includes nine through openings 94 through which pegs 96 can be inserted. An array of photointerrupters 98 are mounted to the printed circuit board 82. Each photointerruptor 98 consists of an infrared emitter and detector mounted in a single housing and separated by an open slot. Any object that blocks the line of sight connection causes a drop in the current output by the detector. Alternatively, the pegs 96 could be detected using inductive coils around each peg opening 94. The inductive coils would be connected to an inductive bridge circuit.

Figure 7:
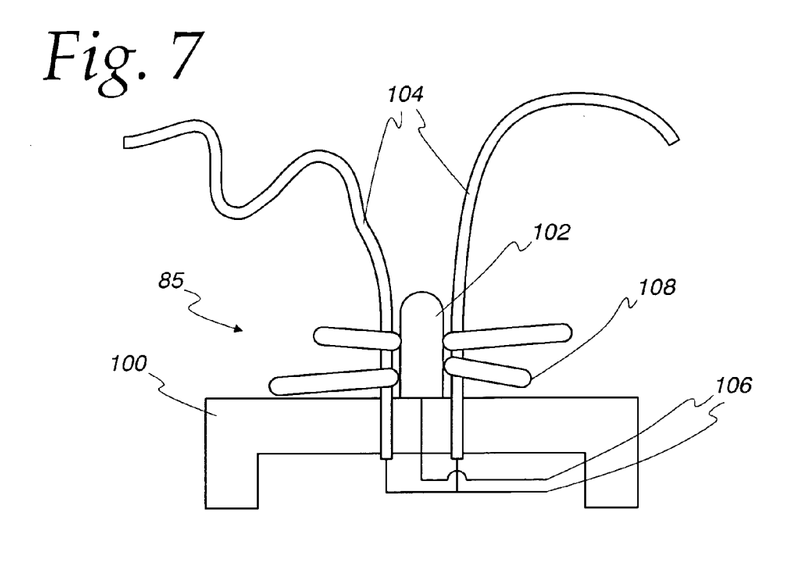
FIG. 7 is a partial sectional view of a ring model of the rotary sensor platform of FIG. 4.

Referring to FIG. 7, the ring module 85 includes an insulated base plate 100 which may comprise the carousel cover 76. A conductive steel post 102 extends upwardly from the base plate. Bent wire forms 104 extend upwardly from the base plate 100 on either side of the conductive post 102. Leads 106 from the conductive post 102 and the bent wire forms 104 provide a resistance measuring point. The bent wire forms 104 are bent into curved shapes. Conductive rubber O-rings 108 are looped over the bent wire forms 104. In this module 85 a total of four rings 108 must be threaded to the base of the wire forms 104. The use of electrically conductive rubber O-rings provides for a resistance or conductivity measurement using the leads 106. As such, resistance between the metallic post 102 and the two wire forms 104 is measured. The conductive post 102 is positioned such that only a small gap separates it from each wire form 104. As the O-rings 108 are pushed down the wire forms 104 it is squeezed into the gap between the post 102 and the wire forms 104. Each additional O-ring 108 will lower the resistance measured at the leads 106. When the resistance falls below a certain value, then task completion is detected. An alternative approach would be to detect the presence of each O-ring 108 with an optical sensor.

Figure 8:
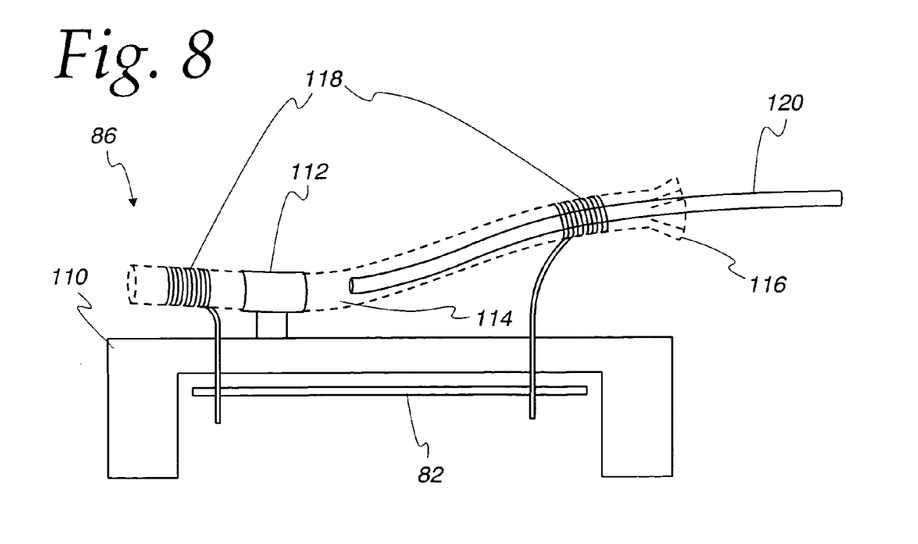
FIG. 8 is a partial sectional view of canulation model of the rotary sensor platform of FIG. 4.

Referring to FIG. 8, the canulation module 86 is illustrated. The canulation module 86 includes a base plate 110 which may comprise the carousel cover 76. A clamp 112 extends upwardly from the base plate 110 and supports a clear plastic tube 114 having a flared end 116. Inductive windings 118 are placed near each end of the tube 114. Ends of the windings 118 are connected to the printed circuit board 82. To perform the canulation task, an operator inserts an elongate element 120, such as a standard pipe cleaner, through the section of clear plastic tubing 114. The element 120 can be extracted from the opposite end. By measuring the change in inductance at each end, the introduction of the metallic core of the pipe cleaner 120 can be detected. At least two detectors are necessary to determine that the pipe cleaner 120 has actually passed through the tube 114. Alternatively, an optical reflectance measurement could be used.

Figure 9:
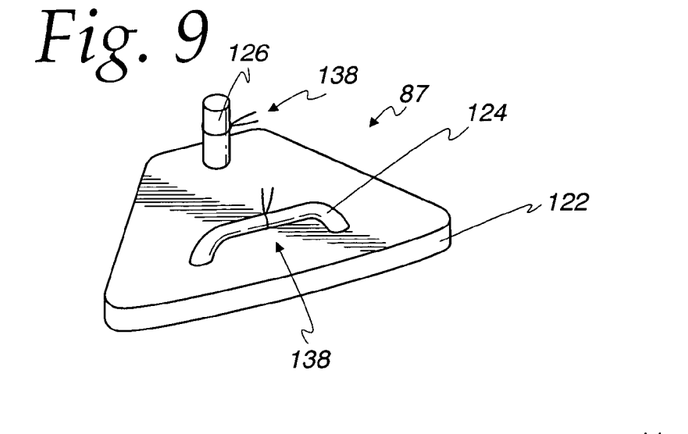
FIG. 9 is a perspective view of a knot tying model of the rotary sensor platform of FIG. 4.
Figure 10:
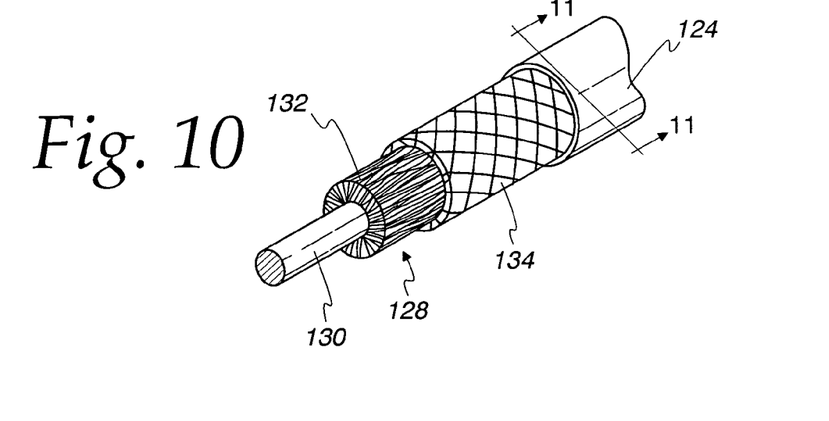
FIG. 10 is a cutaway perspective view of a cable used on the knot tying model of FIG. 9.
Figure 11:
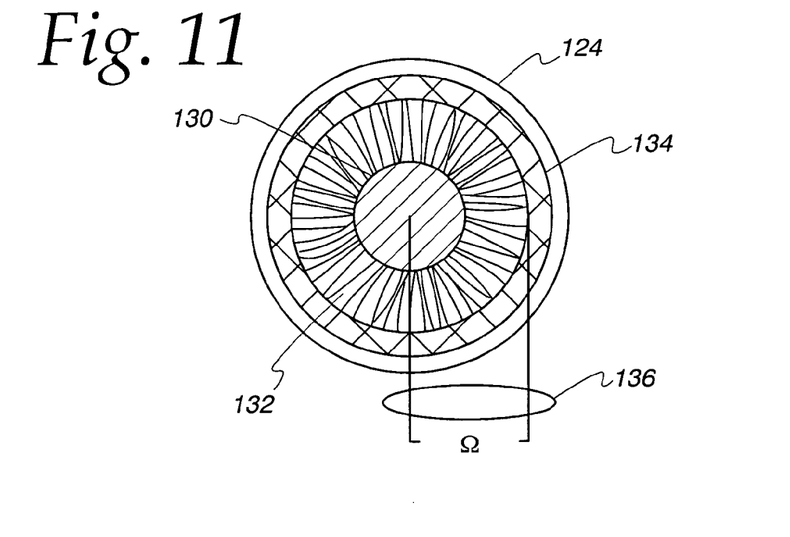
FIG. 11 is a sectional view taken along the line 11-11 of FIG. 10.

Referring to FIG. 9, the knot tying module 87 is illustrated. The knot tying module 87 comprises a base plate 122 which may comprise the carousel cover 76. The base plate 122 supports a horizontally oriented tubular element 124 and a vertically oriented tubular element 126. FIGS. 10 and 11 illustrate a portion of the horizontal tubular element 124 which encloses a coaxial cable 128. Each of the tubular elements 124 and 126 enclose such a cable 128. Particularly, the coaxial cable 128 includes a conductive rod core 130 surrounded by a conductive foam 132 which is in turn surrounded by a metal braid 134 enclosed within the tubing element 124. As illustrated in FIG. 11, leads 136 can be electrically connected to the rod core 130 and metal braid 134 to measure resistance or conductivity between the core 130 and the braid 134. The leads 136 are to be electrically connected to the printed circuit board 82, see FIG. 5. Particularly, as a knot 138 is tied around either tubular element 124 or 126, see FIG. 9, the conductive foam is compressed so that the wire braid 134 is closer to the rod core 130 to decrease resistance. The resistance will be monitored to determine the level of deformation exacted by the cinching of the knot 138 around one of the tubular elements 126 and 124.

Figure 12:
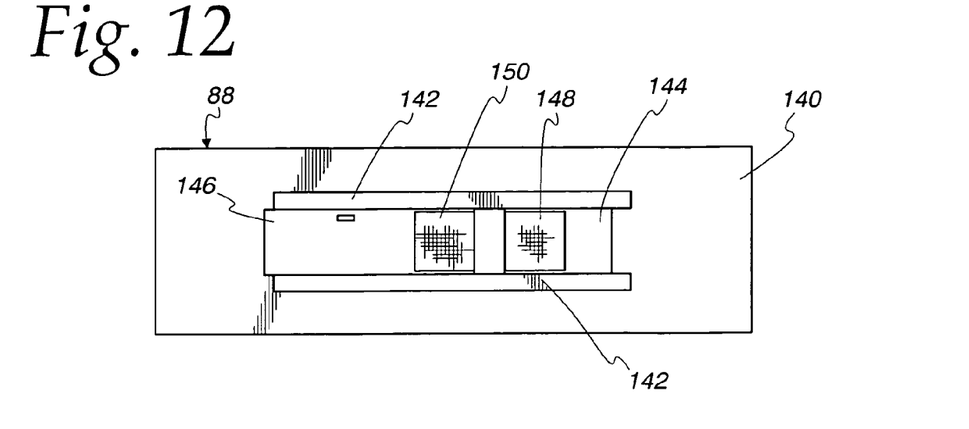
FIG. 12 is a top plan view of a knot integrity model of the rotary sensor platform of FIG. 4.
Figure 13:
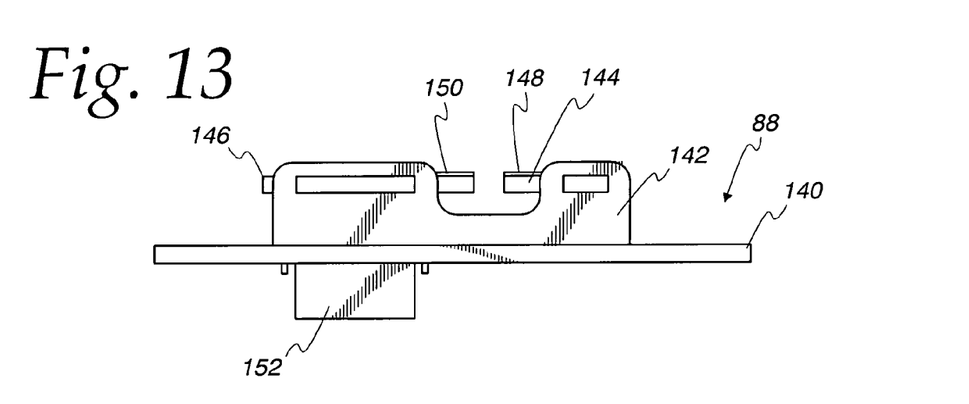
FIG. 13 is a side elevation view of the knot tying model of FIG. 12.
Figure 14:
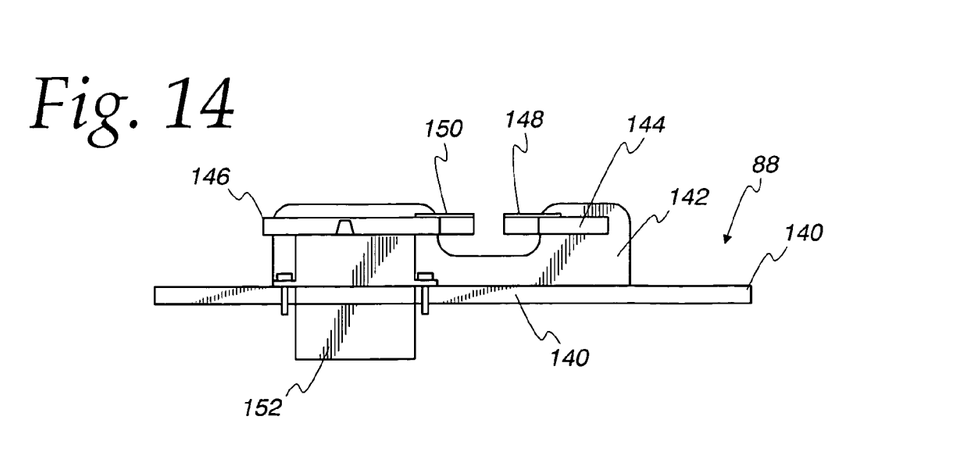
FIG. 14 is a elevation view, similar to FIG. 13, with parts removed for clarity.

Referring to FIGS. 12-14, the knot integrity test module 88 is illustrated. The module includes a base plate 140 which may comprise the carousel cover 76. A pair of plate track and supports 142 extend upwardly from the base plate 140 for supporting a fixed plate 144 and a moveable plate 146. A piece of nylon webbing 148 is secured to the fixed plate 144. A second piece of nylon webbing 150 is secured to the moveable plate 146. A servo motor 152 is fixedly mounted to the base plate 140 and is operatively connected to the moveable plate 146 to drive the same linearly back and forth, i.e., towards and away from the fixed plate 144. The servo motor 152 is electrically connected to the printed circuit board 82, see FIG. 5, in a conventional manner. The operator will complete a suturing task across the nylon webbing 148 and 150. Upon completion of the task, determined by the operator pressing a button, the moveable plate 146 is moved away from the fixed plate 144 with a force of at least three pounds. A proper knot provides a stress which prevents displacement by the servo motor 152. Thus, servo motor displacement can be used to sense if the knot slips or has been maintained.

Figure 15:
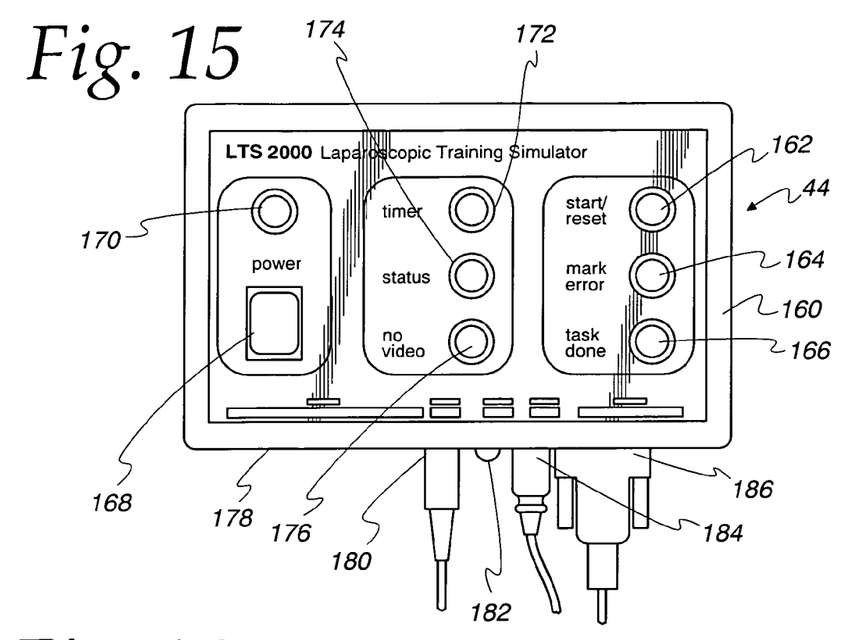
FIG. 15 is a plan view of a control panel of the medical training apparatus of FIG. 1.

Referring to FIG. 15, the control panel 44 comprises a system controller in a rectangular enclosure 160 that can be affixed to the front face of the frame 32. The enclosure 160 supports a start/reset button 162 to start or reset a given task; a mark error button 164 to allow undetected errors, such as dropping a peg 96, to be logged; and a task done button 166 to mark completion of a task. A power switch 168 is used for turning the system controller 44 on or off which is indicated by a power LED 170. Additionally, the enclosure 160 supports a timer LED 172 that flashes while a timer is running, a status LED 174 is used to indicate the system is ready and also error messages, and a no video LED 176 is illuminated when input video is missing.

A bottom edge of the enclosure 160 includes a sensor data bus connector 178, a power input 180, a composite video input 182, composite video out 184 and an RS232 serial data port 186.

Figure 16:
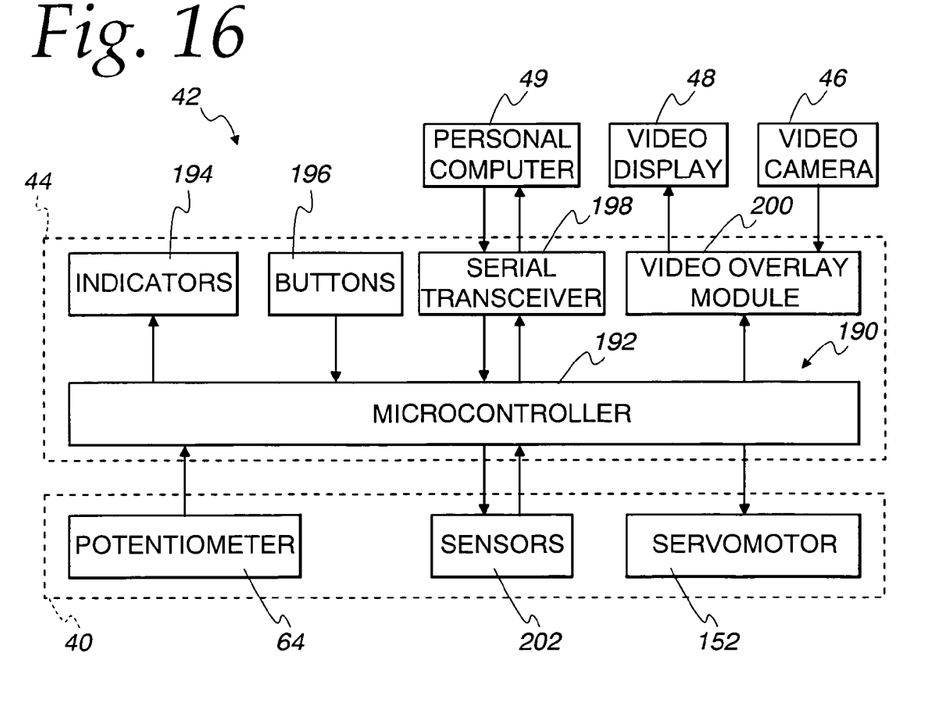
FIG. 16 is a block diagram of a control unit for the medical training apparatus of FIG. 1.

Referring to FIG. 16, a block diagram of the control system 42 is illustrated. The system controller 44 includes a control circuit 190 having a microcontroller 192. The microcontroller 192 is connected to indicators 194, including the LEDs 170, 172, 174 and 176, see FIG. 15, and buttons 196, including push buttons 162, 164 and 166. The microcontroller 192 is connected to the personal computer 49 via an RS232 serial transceiver circuit 198. The microcontroller 192 is connected to a video overlay module 200. The video camera 46 and video display 48 are in turn connected to the video overlay module 200. The microcontroller 192 is also connected via the sensor data bus connection 178 to the printed circuit board 82 of the sensor platform 40. Particularly, the microcontroller 192 is electrically connected to the platform potentiometer 64, see FIG. 5, to the servo motor 152, see FIG. 14, and sensors 202. The sensors 202 include the various sensing elements monitored by the printed circuit board 82 as shown in FIG. 6-11 and discussed above.

Figure 17:
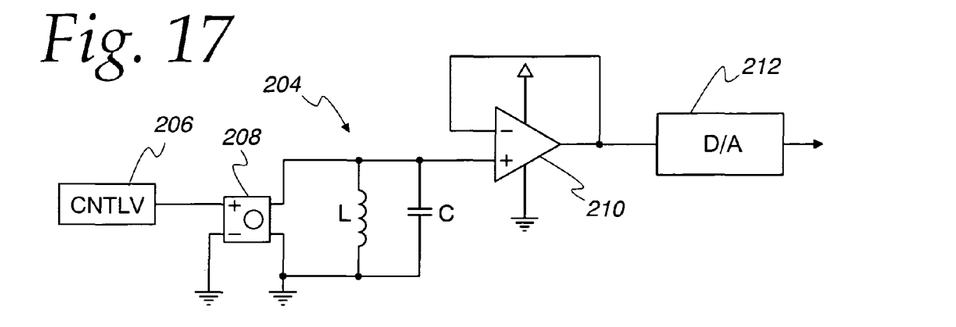
FIGS. 17-19 are electrical schematics of sensor interface circuits of the control system of FIG. 16.
Figure 18:
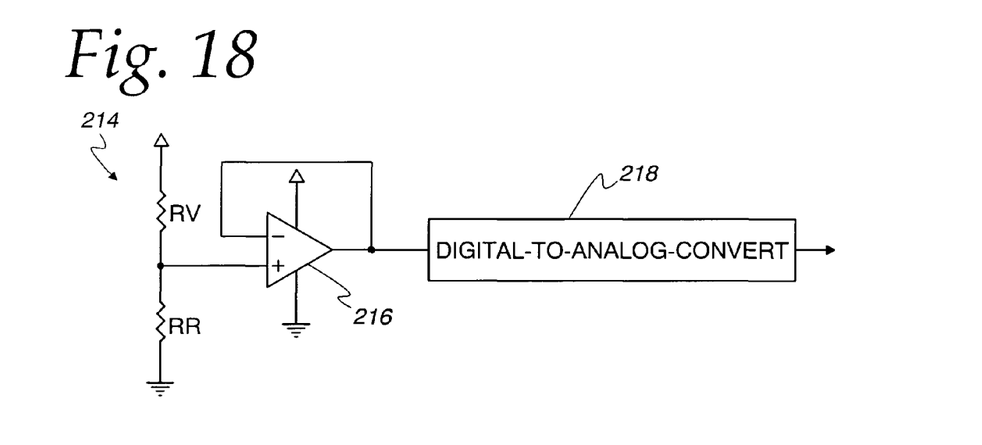
Figure 19:
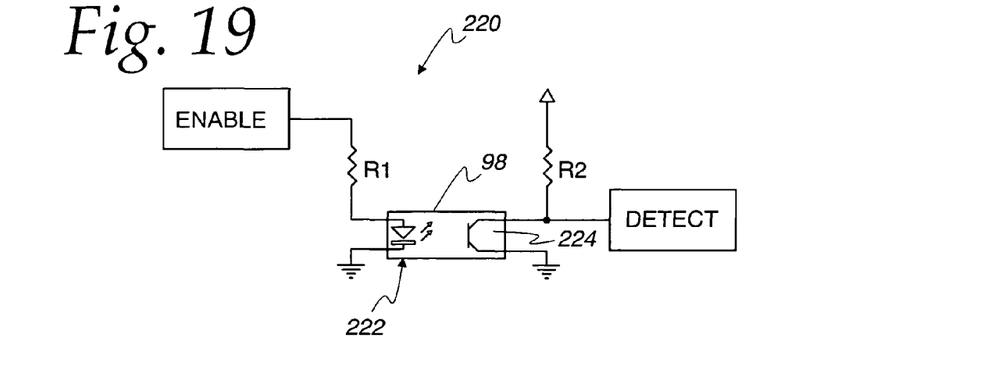

FIGS. 17-19 comprise electrical schematics illustrating interface circuits between the various sensor devices and the microcontroller 192. These circuits may be included on the printed circuit board 82 or the control circuit 190. FIG. 17 illustrates an inductance measurement circuit 204. A control voltage 206 from the microcontroller 192 is supplied to a voltage controlled oscillator 208. Connected across the voltage controlled oscillator 208 are a variable inductor L and a capacitor C. The inductor L represents an inductance being measured, such as one of the inductors 118 of FIG. 8. One side of the oscillator output is connected to ground. The other side is connected to the non-inverted input of an operational amplifier 210. The output of the operational amplifier 210 is connected as feedback to the inverted input and to a digital to analog (D/A) convertor 212 which provides an inductance value to the microcontroller 192.

FIG. 18 illustrates a conductance or resistance measurement circuit to 14. The resistance measurement circuit includes a voltage divider formed by a variable resistor RV and a reference resistor RR. The variable resistor RV represents the resistance being sensed, such as resistance across the leads 106 in FIG. 7 or resistance across the lines 136, see FIG. 11. The junction between the resistors RV and RR is connected to the non-inverted input of an operational amplifier 216. The output of the operational amplifier 216 is connected as feedback to the inverted input and is supplied to a D to A convertor 218 which provides a resistance value to the microcontroller 192.

FIG. 19 illustrates an electrical schematic for a photointerruptor circuit 220. An enable output for the microcontroller 192 is connected via a resistor R1 to an LED 222 of the photointerruptor 98. A detector 224 of the photointerruptor 98 is connected via a resister R2 to voltage supply and to a detect input of the microcontroller 192.

The microcontroller 192 contains software and firmware to allow basic operation of the medical training apparatus 30 with the video monitor 48 as the display and a further indicator. The video overlay module 200, such as a BOB-3 module from Decade Engineering, generates a video overlay signal received from the microcontroller 192.

Figure 20:
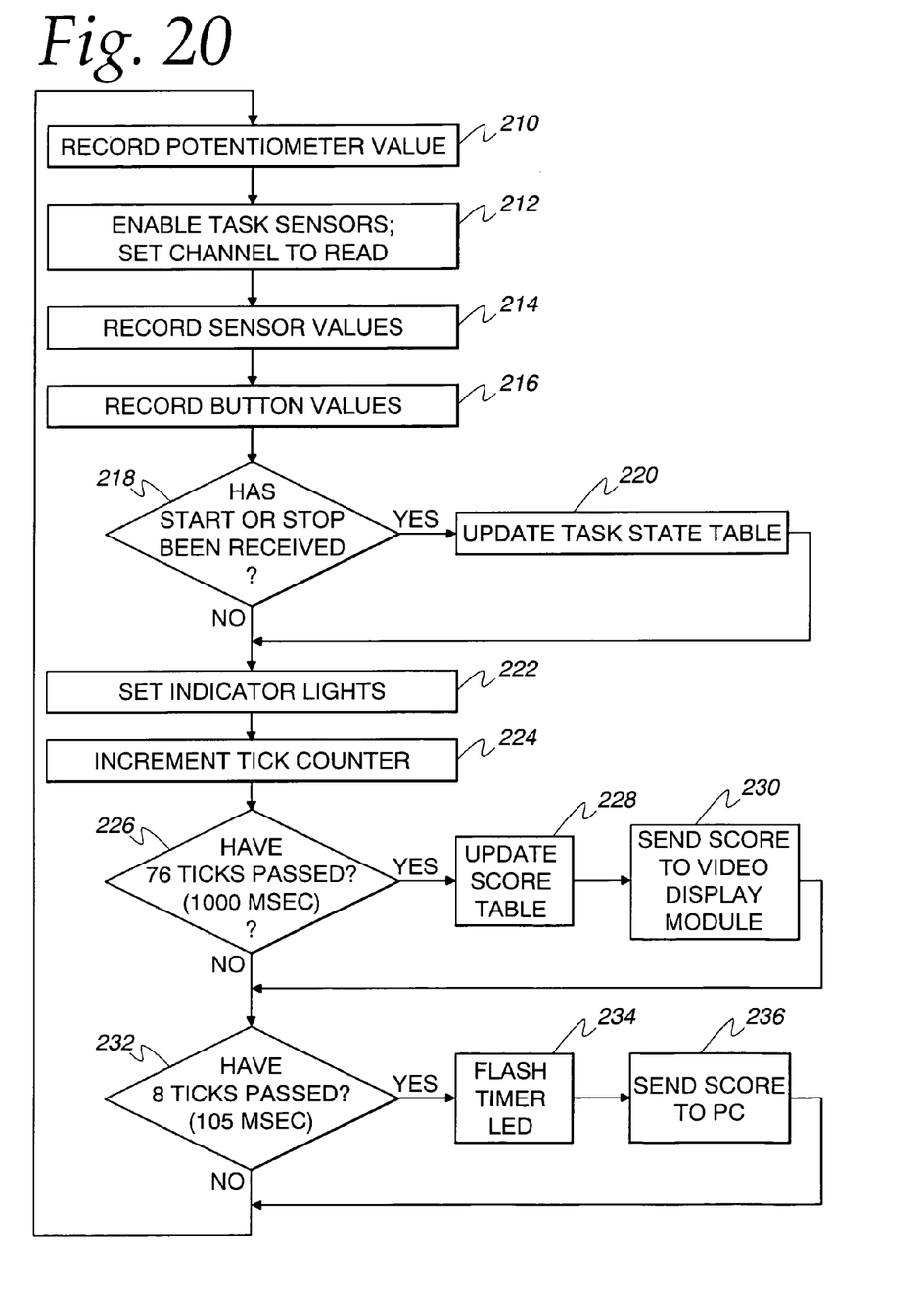
FIG. 20 is a flow diagram illustrating a program implemented in the microcontroller of FIG. 16.

Referring to FIG. 20, a flow diagram illustrates a program implemented by the microcontroller 192 of FIG. 16 during operation. As is apparent, this operation would be implemented subsequent to start up during normal operation of the device.

The flow diagram begins at a block 210 which records a potentiometer value from the sensor platform potentiometer 64 representing angular position of the sensor platform. This is used to determine which of the five tasks is to be performed. A block 212 then enables the appropriate task sensors and sets the appropriate channels to be read. A block 214 records sensor values and a block 216 records button values for any control panel buttons 196 pressed by the operator.

A decision block 218 determines if a start or stop command has been received as by depressing the start button 162 or the task done button 166, see FIG. 15. If so, then a block 220 updates a task state table. Thereafter, or if not, then a block 222 sets the indicator lights 194 as appropriate for the state of operation. A block 224 increments a tick counter used to time the various surgical tasks. A decision block 226 determines if 76 ticks (representing 1,000 milliseconds) have passed. If so, then a score table is updated at a block 228 and the score is sent to the video overlay module 200 at a block 230. Thereafter, or if 76 ticks have not passed, as determined at the decision block 226, then a decision block 232 determines if eight ticks (representing 105 milliseconds) have passed. If so, then the timer LED 172, see FIG. 15, is flashed at a block 234. The current score is sent to the personal computer 49 at a block 236. Thereafter, or if eight ticks have not passed, then control returns back to the block 210 to repeat the process.

Figure 21:
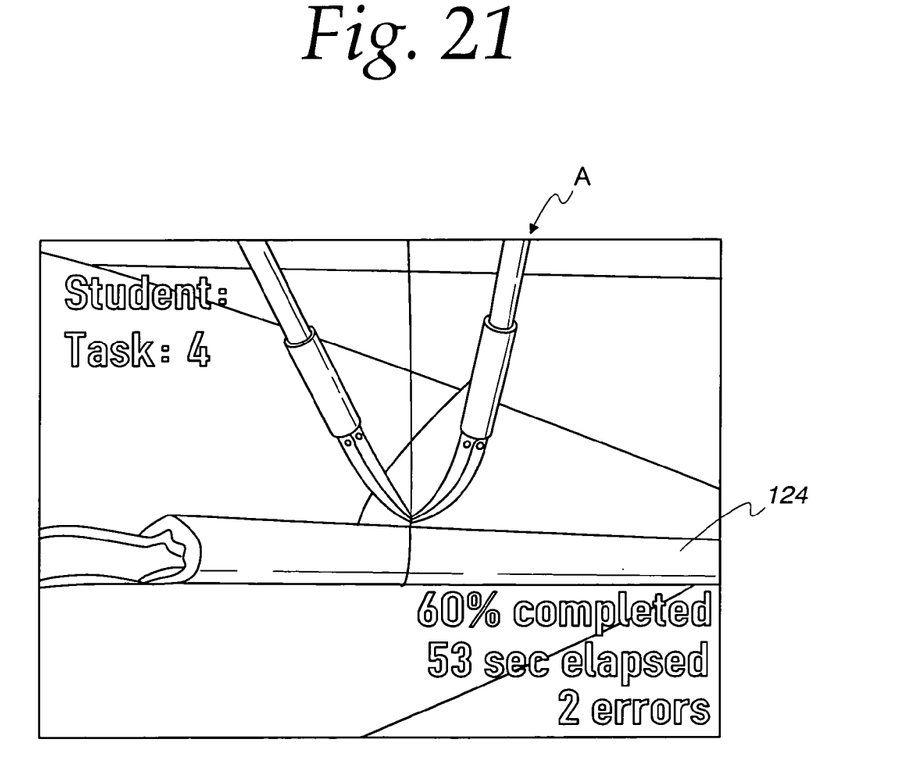
FIG. 21 is a video monitor displayed displaying video from the camera with an overlay indicating status of a medical procedure, in accordance with the teachings of the invention.

As such, the control program continually records status of the medical procedure being performed, resulting from a change of state of a model caused by the employed medical instrument, and provides a measured, quantitative indication of the status relating to at least one of: a) completion time; b) percent of completions; and c) errors. The status is indicated via the LEDs 172, 174 and 176, as well as using the video monitor 48. Particularly, FIG. 21 illustrates a screen display on the video monitor 48 during the knot tying task. The monitor shows the image being recorded by the camera 46. In this instance, the camera is recording the tying of a knot about the horizontal tubular element 124, using an instrument, for example the instrument A. Overlayed on the video display is identification of the operator, the task number, the calculated percent of completion of the task, the elapsed time and the calculated number of errors sensed. The overlay information is provided by the microcontroller 192 in response to information from the sensors 202 and provided to the video overlay module 200 which overlays it on the captured image.

Thus, in accordance with the invention, there is provided a medical training apparatus in the form of a laparoscopic training simulator that utilizes natural haptics, which provide realistic physical experience; electronic sensing, which enables objective real-time feedback and measurement; and digitization of the performance data, which allows for streamlined computer-based analysis. Particularly, the personal computer 49 provides a mechanism for logging test data. Software on the PC records task number and completion time to a spreadsheet or database file. The PC software can be configured to provide for operator enrollment, logging in and out, performance status feedback, rotating stage position, test control/controller status, device diagnostics, cumulative scores and user score logging and recall functions.

We claim:

1. A medical training apparatus comprising:
a frame defining a working space simulating a body cavity and having an access opening to allow introduction of a medical instrument to the working space from externally of the working space;
a model mounted in the working space upon which a procedure corresponding to a medical procedure can be performed with a medical instrument to thereby change a state of the model;
a sensor operatively associated with the model for sensing progress of the procedure; and
a control unit coupled to the sensor for monitoring progress of the procedure and providing an indication of status of the procedure resulting from a change of state of the model caused by the medical instrument, wherein the model comprises a peg board model comprising a plate having a plurality of openings and a plurality of pegs for insertion in the openings and the sensor senses presence or absence of a peg in each opening.

2. The medical training apparatus of claim 1 wherein the sensor comprises a plurality of photointerrupters.

3. A medical training apparatus comprising:

a frame defining a working space simulating a body cavity and having an access opening to allow introduction of a medical instrument to the working space from externally of the working space;

a rotary platform rotationally mounted in the working space for rotating the platform to select angular positions for performing a series of simulated medical procedures;

a plurality of modules mounted around a perimeter of the rotary platform, each module comprising a different discrete model upon which a movement commonly carried out during a medical procedure can be performed by using a medical instrument to perform a specific task that changes the model in a predetermined manner;

a plurality of sensors each operatively associated with one of the modules for sensing progress of the associated, simulated medical procedure by sensing changes to the associated model resulting from performance or attempted performance of the associated task and generating signals as an incident of the associated model changing; and a control unit coupled to the sensors for monitoring progress of performance of the task by receiving and processing the signals to thereby provide a measured and calculated, quantitative indication of status of performance of the task relating to at least two of: a) completion time; b) percent of completion; and c) errors by deviation from the predetermined manner of changing the model.

4. The medical training apparatus of claim 3 wherein one of the models comprises a ring model comprising a plate having a conductive post spaced from a bent wire and a conductive rings to be received on the wire and the associated sensor senses presence or absence of the ring on the wire.

5. The medical training apparatus of claim 4 wherein the associated sensor measures resistance between the post and the wire.

6. The medical training apparatus of claim 4 wherein the conductive rings comprise conductive rubber O-rings.

7. The medical training apparatus of claim 3 wherein one of the models comprises a canulation model comprising a plate supporting a tube for receiving an elongate element and the associated sensor senses presence or absence of the elongate element in the tube.

8. The medical training apparatus of claim 7 wherein the associated sensor comprises an inductive winding surrounding the tube and the control unit senses changes in inductance.

9. The medical training apparatus of claim 3 wherein one of the models comprises a knot tying model comprising a base supporting a tubular elements and the associated sensor comprises a coaxial cable in the tubular element having a conductive foam insulator and the control unit measures conductivity across the coaxial cable.

10. The medical training apparatus of claim 3 wherein one of the models comprises a knot integrity model comprising first and second webs supported relative to a base and the associated sensor comprises means for moving the webs relative to one another and detecting displacement between the webs.

11. The medical training apparatus of claim 10 wherein the first plate is fixed and the associated sensor comprises a servo motor operatively coupled to the second web for moving the second web relative to the first web.

12. The medical training apparatus of claim 3 wherein the control unit additionally comprises a video camera for photographing the working space and a video monitor displaying video from the camera with an overlay indicating status of the medical procedures as generated through the sensor separately from the video camera and using the sensor signal.

13. The medical training apparatus of claim 3 wherein the control unit includes actuators for manually initiating the simulated medical procedures and visual indicators for indicating status of the medical procedures.

14. The medical training apparatus of claim 3 wherein the control unit further comprises a programmed processing system for logging results of simulated medical procedures.

15. The medical training apparatus of claim 3 wherein the rotary platform comprises a potentiometer mounted to a base and a carousel mounted to the potentiometer so that the carousel is rotational relative to the base and the potentiometer is electrically connected to the control unit to detect angular position.

16. The medical training apparatus of claim 15 wherein the carousel supports the modules and a circuit board connecting the sensors.

17. The medical training apparatus according to claim 3 wherein the calculated quantitative indicator of status is a numerical score.

18. A medical training apparatus comprising a frame defining a working space simulating a body cavity and having an access opening to allow introduction of a medical instrument to the working space from externally of the working space;

a rotary platform rotationally mounted in the working space for rotating the platform to select angular positions for performing a series of simulated medical procedures;

a plurality of modules mounted around a perimeter of the rotary platform, each module comprising a different model upon which an associated medical procedure can be performed with a medical instrument;

a plurality of sensors each operatively associated with one of the modules for sensing progress of the associated medical procedure; and a control unit coupled to the sensors for monitoring progress of the medical procedures and providing a measured quantitative indication of status of the medical procedures relating to at least one of: a) completion time; b) percent of completion; and c) errors, wherein one of the models comprises a peg board model comprising a plate having a plurality of openings and a plurality of pegs for insertion in the openings and the associated sensor senses presence or absence of a peg in each opening.

19. The medical training apparatus of claim 18 wherein the associated sensor comprises a plurality of photointerrupters.

* * * * *